United States Patent [19]

Collins et al.

[11] 4,190,136
[45] Feb. 26, 1980

[54] COUPLING APPARATUS

[75] Inventors: Marcus H. Collins, Akron; Kiritkumar R. Patel, North Royalton, both of Ohio

[73] Assignee: Eaton Corporation, Cleveland, Ohio

[21] Appl. No.: 959,972

[22] Filed: Nov. 13, 1978

[51] Int. Cl.² .............................................. F16D 49/14
[52] U.S. Cl. .............................. 188/367; 188/250 G; 192/88 B
[58] Field of Search ............................... 188/365–367, 188/250 G, 78; 192/88 B

[56] References Cited

U.S. PATENT DOCUMENTS

| | | | |
|---|---|---|---|
| 1,686,189 | 10/1928 | Thompson | 188/250 G X |
| 2,251,445 | 8/1941 | Fawick | 192/88 B |
| 2,662,625 | 12/1953 | Fawick | 192/88 B |
| 2,720,288 | 10/1955 | Keller | 188/367 |
| 3,022,877 | 2/1962 | Fawick | 192/88 B |
| 3,173,527 | 3/1965 | Eakin | 188/367 X |

Primary Examiner—Duane A. Reger
Attorney, Agent, or Firm—R. J. McCloskey; M. L. Union

[57] ABSTRACT

A coupling includes a rim assembly, a drum assembly rotatable relative to the rim assembly about an axis of rotation, a pneumatically expandable tube having an exterior surface attached to the rim assembly, a plurality of spaced apart lugs disposed on the exterior surface of the tube element and a plurality of shoe members each of which includes first and second spaced apart parallel surfaces. Each of the shoe members includes means on the first surface thereof which is connectable with one of the lugs on the tube element to support the first surface of the shoe member contiguous to the exterior surface of the tube member. The shoe members includes a plurality of friction pads attached thereto which are movable in a radial direction between a first position in which the friction pads engage with the drum assembly to couple the rim and drum assemblies upon expansion of the tube element and a second position in which the friction pads are spaced apart from the drum assembly to permit relative rotation between the drum and rim assemblies. A plurality of projections are disposed on the first surface of each of the shoe members. The projections are disposed substantially parallel to the axis of rotation and each has a length which is at least 80% of the width of the shoe member when taken parallel to the axis of rotation. A plurality of parallel corresponding indentations are disposed on the exterior surface of the tube member. Each of the indentations on the tube element is adapted to receive a corresponding projection on the shoe member therein to enable the shoe members to transfer torque through the tube element to the rim assembly. The projections on the shoe members and indentations on the tube element all have a substantially acruate cross-sectional configuration to eliminate stress concentrations in the tube element when torque is transferred from the shoe members through the tube element to the rim assembly.

24 Claims, 6 Drawing Figures

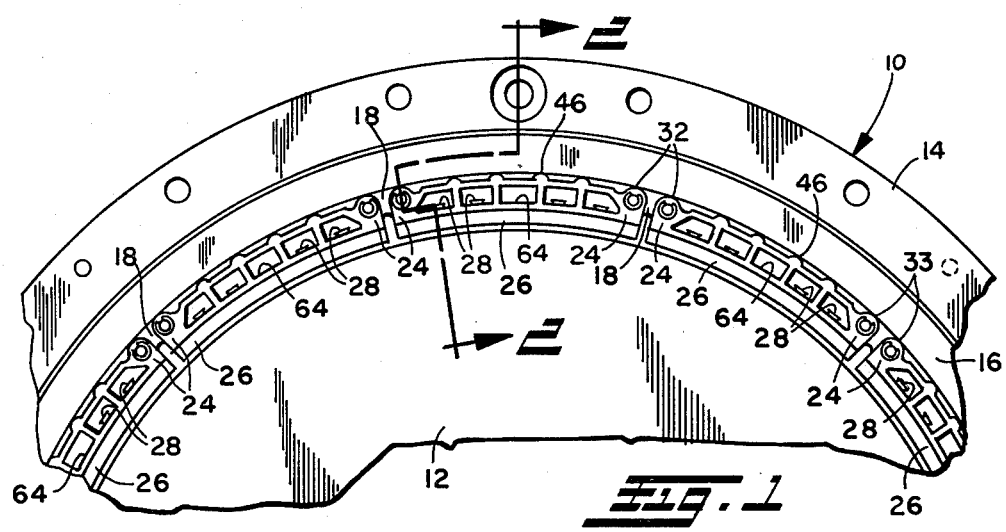
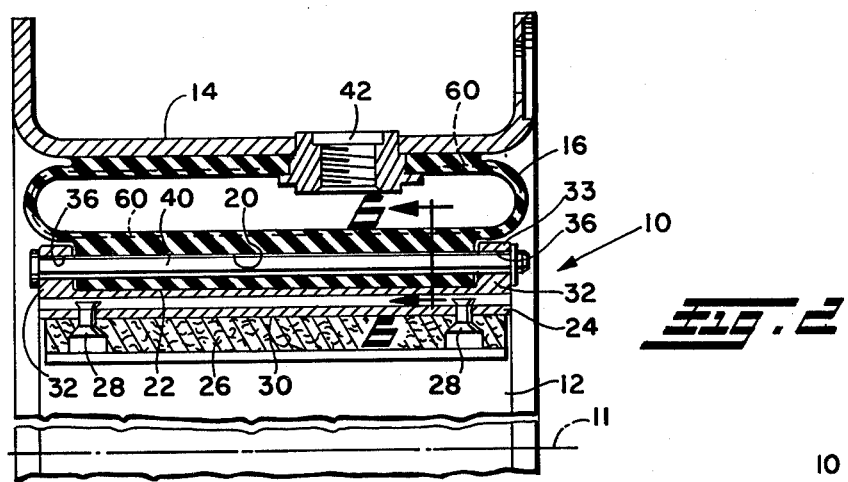
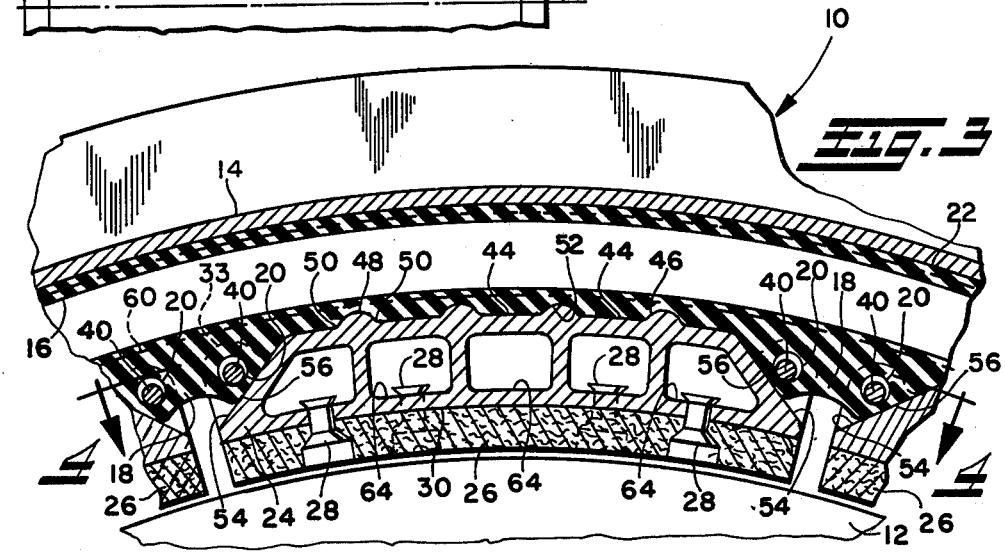

COUPLING APPARATUS

BACKGROUND OF THE INVENTION

1. Field of the Invention

The present invention relates to a coupling wherein the expansion and contraction of a tube element couples an input and an output member and more particularly to a coupling wherein a plurality of shoe members are connected to the tube element for movement therewith. The plurality of shoe members each include a plurality of projections having an arcuate cross-sectional configuration which extend therefrom and the tube member includes a plurality of corresponding arcuate indentations with each indentation receiving a corresponding one of said plurality of projections therein. The projections and indentations cooperate to transfer torque between the input and output members.

2. Background of the Invention

Couplings which utilize an expandable fluid element to effect coupling of an input and an output member are known in the art. In clutches such as shown in the Fawick U.S. Pat. No. 3,022,877, torque is transferred to the tube element therein through the cooperation of the projections disposed on the tube element and the indentations disposed on the shoe member and through the cooperation of the pins and lugs 24. It is desirable to provide an assembly similar to that shown in the Fawick U.S. Pat. No. 3,022,877 but to improve the torque carrying capabilities and reliability of the coupling.

SUMMARY OF THE INVENTION

The present invention provides a new and improved coupling including a rim assembly, a drum assembly, and a fluid expandable tube element having an exterior surface connected to the rim assembly for rotation therewith relative to the drum assembly. A plurality of lugs are disposed on the exterior surface of the tube element. A plurality of shoe members are provided each of which includes first and second parallel spaced apart surfaces. Each of the shoe members include means on the first surface connectable with the lugs on the tube element to support the first surface of the shoe member contiguous to the exterior surface of the tube element. A plurality of projections are located on the first surface of each of the shoe members with each of the projections being substantially parallel to the axis of rotations of the drum assembly and having a length which is at least 80% of the width of the shoe member taken parallel to the axis of rotation. A plurality of complementary parallel indentations are disposed on the exterior surface of the tube element and each of the indentations is adapted to receive a corresponding one of the projections disposed on the shoe member to provide for the transfer of torque from the shoe member to the tube element to the rim assembly.

Another provision of the present invention is to provide a new and improved coupling including a rim assembly, a drum assembly rotatable relative to the rim assembly, an expandable tube element having an exterior surface connected to the rim assembly for rotation therewith, a plurality of spaced apart lugs disposed on the tube element, and a plurality of shoe members each of which includes first and second parallel spaced apart surfaces. Each of the shoe members includes means disposed on the first surface to engage with one of the lugs on the tube element to support the first surface of the shoe member contiguous to the exterior surface of the tube element. A plurality of projections are disposed on the first surface of each of the shoe members with each of the projections being disposed substantially parallel to the axis of rotation and having a substantially arcuate cross-sectional configuration taken substantially perpendicular to the axis of rotation. A plurality of corresponding parallel indentations are disposed on the exterior surface of the tube member with each of the indentations having a substantially arcuate cross-sectional configuration and being adapted to receive a corresponding one of the projections of the shoe member therein to enable the projections to cooperate with their corresponding indentation to transfer torque from the shoe member through the tube element to the rim assembly.

A further provision of the present invention is to provide a new and improved coupling including a rim assembly, a drum assembly rotatable relative to the rim assembly, and a pneumatically expandable tube element having an exterior surface connected to the rim assembly for rotation therewith. The tube element includes a plurality of spaced apart lugs disposed on the exterior surface. A plurality of shoe members are also provided each of which includes first and second parallel spaced apart surfaces. Each of the shoe members includes means disposed on the first surface connectable with one of the lugs of the tube element to support the first surface of the shoe member contiguous to the exterior surface of the tube element. The tube element has a shape factor of at least 15. A plurality of projections are disposed on the first surface of each of the shoe members substantially parallel to the axis of rotation and a plurality of complementary parallel indentations are disposed on the exterior surface of the tube member with each of the indentations being adapted to receive one of the projections on the shoe members.

DESCRIPTION OF THE DRAWINGS

FIG. 1 is a fragmentary sectional side view of a coupling apparatus of the present invention.

FIG. 2 is a slightly enlarged sectional view taken approximately along the lines 2—2 of FIG. 1.

FIG. 3 is an enlarged view of a shoe member and tube element of the present invention.

DESCRIPTION OF THE PREFERRED EMBODIMENT

Figure 4:
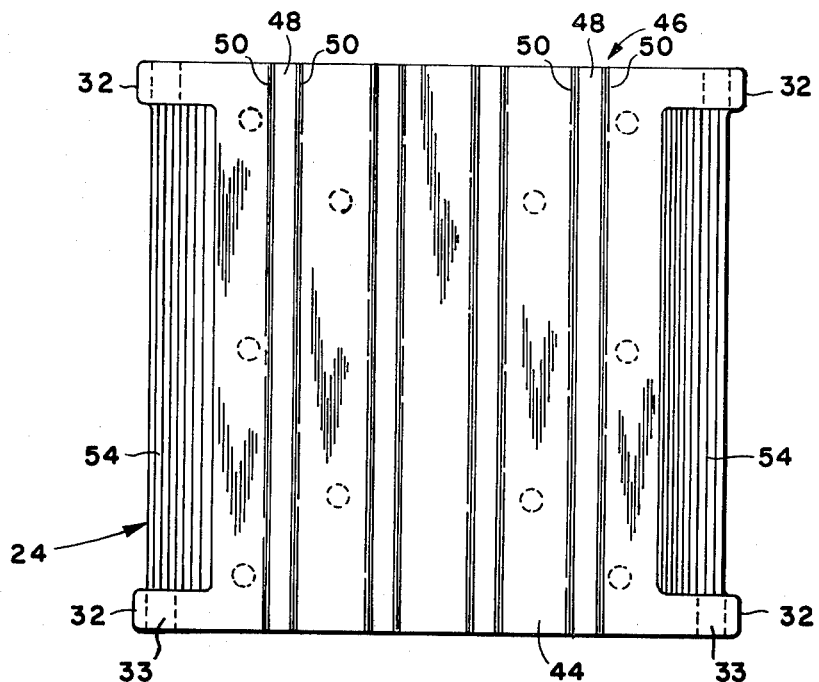
FIG. 4 is a top view of the shoe member taken approximately along lines 4—4 of FIG. 3.

Referring to the drawings, and more particularly to FIGS. 1 and 2, a coupling 10 includes a drum 12 and a rim assembly 14. The drum 12 and rim assembly 14 are rotatable relative to each other about an axis of rotation 11. The coupling 10 can be used for a brake or a clutch, as is well known. If it is desired to use the coupling 10 as a brake, one of the members 12, 14 will be fixed and if it is desired to use the coupling 10 as a clutch, both of the members 12 and 14 will be rotatable. Accordingly, the term coupling as used herein will refer to either a clutch or a brake.

Attached to the rim assembly 14 is a fluid expandable tube element 16 which is preferably constructed of rubber or an elastomeric compound. The tube element 16 includes an exterior surface including a surface portion 22 which is attached, preferably by bonding, to the rim assembly 14. A plurality of spaced apart lugs 18 are disposed on the exterior surface of the tube element 16. Each of the lugs 18 include therein a pair of cylindrical openings 20 which are disposed parallel to the axis of rotation of the drum 12.

A plurality of shoe members 24 are connected to the lugs 18 on the tube element 16 for movement therewith. Each of the shoe members 24 includes a friction pad 26 which is riveted by the rivets 28 to an external surface 30 of the shoe member 24. The shoe member 24 includes an external surface 44 which is disposed substantially parallel to but spaced apart from surface 30. Two pairs of tabs 32 are located on surface 44 with each tab 32 being disposed on a corner thereof. Each of the tabs 32 include a cylindrical opening 36 disposed therein with the cylindrical opening 36 in each pair of tabs 32 being aligned. The tabs 32 are spaced apart a distance which is greater than the width of the lugs 18 to enable the tabs 32 to straddle the lug 18 as is illustrated in FIG. 2 to locate and secure the shoe member 24 on the tube element 16. A pin 40 is disposed through the aligned openings 36 in each of the pair of tabs 32 and the opening 20 in the lug 18 to thereby connect the shoes 24 to the lugs 18 for movement therewith. As is more fully illustrated in FIG. 3, each lug 18 includes two spaced apart parallel openings 20 therein each of which is adapted to support through a pin 40 one side of a shoe 24 therein. Thus, two lugs 18 are required to support each shoe and each lug 18 supports the adjacent sides of two adjacent shoes 24.

Figure 6:
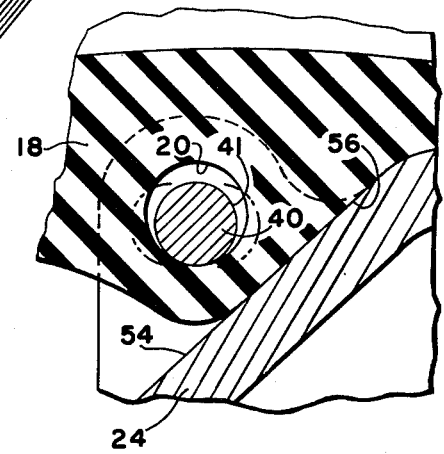
FIG. 6 is a slightly enlarged fragmentary sectional view taken approximately along the lines 6—6 of FIG. 2 showing the relationship of the pin and opening in full lines when the tube is in its contracted condition and showing the relationship in phantom lines when the tube is in its expanded condition.

The diameter of the openings 20 in each of the lugs 18 is slightly larger than the outer diameter of the pin 40. Each of the pins 40 include an exterior surface 41. The radial distance from the axis of rotation between the exterior surface 41 of pin 48 and exterior surface 44 of the shoe 24 and the radial distance from the axis of rotation between the surface defining opening 20 and the exterior surface of the tube element 16 adjacent shoe 24 is maintained to preload the shoe 44 against the exterior surface of the tube 16. Thus, when the pin 40 is received in opening 20 and the tabs 32, the exterior surface of the shoe 24 will be tightly received or preloaded against the exterior surface of the tube element 16 when the element 16 is in its collapsed condition. When the tube element 16 is expanded, the rubber material in the lug 18 will be compressed in a radial direction and the opening 20 will assume an oblong configuration as illustrated by phantom lines in FIG. 6. When the tube 16 is expanded and the opening 20 has an oblong configuration and the shoe 24 will be tightly received against the exterior surface of the tube element due to the radial forces acting thereon from the tube 16 and drum 12 and the pin 40 will be allowed to move in a tangential direction relative to the oblong opening 20 without impacting any strain to the rubber in lug 18 surrounding opening 20. The difference in diameter of the pin 40 and the cylindrical opening 20 along with the oblong configuration of opening 20 allows slight tangential movement of the shoe 24 relative to the tube element 16 without transferring forces from the shoe 24 through the pin 40 to the rubber lug 18. This will prevent tangential movement of the resilient material surrounding opening 20 due to slight torsional vibrations of the shoe 24. The difference in diameter of the pin 40 and the opening 20 and the oblong shape of the opening 20 minimizes torsional vibrations of the lugs 18 through the pins 40 which could create cracking or tearing of the rubber of the lug 18.

The tabs 32 are spaced apart in a radial direction from the tube element 16. To this end an exterior arcuate surface 33 of each of the tabs 32 is spaced apart from the exterior surface of the tube element 16. This prevents the exterior surface 33 of the tabs 32 from rubbing on the exterior surface of the tube element 16 which would cause cracking or peeling of the tube element in the event the shoe 24 vibrates relative to the tube element 16 or the tabs engage with the exterior surface of the tube element upon expansion or contraction of the tube.

The tube element 16 includes an inlet valve 42 which communicates with the interior of the tube element 16. When a fluid, such as air, is directed through the valve 42, the tube element 16 will expand causing the shoes 24 to move in a radially inward direction toward the axis of rotation of the drum 12. This will bring the friction pads 26 in contact with the outer surface of the drum 12 to thereby couple the drum 12 and the rim assembly 14 in a well-known manner. When air is released from the interior of the tube 16, the tube will deflate and the friction pads 26 will move in radially outward direction to disengage from the drum 12 to thereby uncouple the drum 12 and the rim assembly 14.

The configuration of the shoe member 24 has been designed to maximize the torque carrying capability of the coupling. The shoe 24, as is more fully illustrated in FIGS. 3 and 4, includes an upper surface portion 44 which includes a plurality of spaced apart substantially parallel projections 46. The projections, as is illustrated in FIG. 3, are disposed substantially parallel to the axis of rotation and have an arcuate cross-sectional configuration taken substantially perpendicular to the axis of rotation. Each of the projections 46 is composed of a crown or hump portion 48 and a pair of root portions 50. The crown portion 48 is disposed between the root portions 50 and each of the root portions 50 is disposed between the crown portion 48 and the surface 44. The crown portion 48 and the root portions 50 all have an arcuate cross-sectional configuration taken perpendicular to the axis of rotation.

A plurality of complementary indentations or slots 52 are disposed in the portion of the exterior surface of the tube element 16 which is disposed contiguous to the surface 44 of the shoe 24. Each of the indentations 52 has a generally arcuate cross-sectional configuration when taken perpendicular to the axis of rotation 11 and each is adapted to receive a corresponding one of the projections 46 disposed therein. The projections 46 cooperate with the indentations 52 to transfer torque from the shoes 24 to the tube element 16. Each of the shoe members 24 includes an angled end surface 54 which can engage with an exterior surface 56 disposed on the lug 18 of the tube element which supports the shoe 24. When torque is being transferred between the shoe 24 and the tube element 16, the tube element 16 and the shoe 24 will try to rotate relative to each other from their position shown in FIG. 3. This will cause the surfaces 54 and 56 to engage and the projections 46 to engage with the sides of the indentations 52 to effect the torque transfer between the shoe and the tube element 16.

Engagement of the friction pad 26 with the outer surface of the drum 12 results in a torque reaction being set up between the shoes 24 and the tube element 16. This torque reaction will tend to rotate the tube element and rim 14 in the direction of rotation of the drum 12. The torque transferred to the rim 14 will be transferred through the tube element 16. In order to maximize the torque carrying characteristics of the coupling 10, the torque transfer between the shoes 24 and the rim 14 must be maximized.

The provision of cooperating arcuate surfaces on the projections 46 and the indentations 52 minimizes stress risers (stress concentrations) in the rubber of the tube element 16 upon torque transfer. The projections are designed with the maximum radii at the crown 48 and the roots 52 thereof. The arcuate cross-sectional configuration of the projections 46 and the indentations 52 will minimize the stress concentrations in the shoe 24, as well as the rubber of the tube element 16. This allows for efficient load transfer to the rubber tube element 16 from the shoe member 24 without fatiguing of the rubber of the tube element where the torque is transferred from the shoe 24 to the tube element 16. In prior art constructions relatively sharp surface projections were provided with other than an arcuate cross-sectional configuration which tended to increase the stress concentrations in the rubber of the tube element upon torque transfer. The relatively sharp corners or projections in the prior art had a tendency to create stress risers or stress concentrations where the sharp corners engaged the tube element. These stress concentrations result in fatiguing of the rubber and premature failure of the tube element. The provision of an arcuate crown portion 48 and the arcuate root portions 50 and the cooperating surfaces on the indentation 52 minimizes strain concentrations in the rubber and, thus, allows the tube element 16 to transfer a greater amount of torque without fatiguing. Additionally, the indentations 52 and the projections 46 are spaced exactly the same about the circumference of the coupling 10. This allows for equal load distribution on all indentations 52 and projections 46 of the tube element 16 during torque transfer.

The length of the projections 46 taken parallel to the axis of rotation is equal to at least 80% of the width of the shoe member when taken parallel to the axis of rotation. Preferably, as is illustrated in FIG. 4, the projections 46 and the cooperating indentations 52 in the tube element 16 extend the entire width of the shoe member. The greater the width of the projection 46 and the cooperating indentation 52, the greater the surface area of cooperation between the tube 16 and the shoe 24 and, thus, the greater the ability of the structure to transmit torque through the tube element 16 to the rim assembly 14. Thus, it should be apparent that maximizing the axial width of the projections 46 and cooperating indentations 52 increases the surface area of cooperation between the tube element 16 and the shoe members 24. Additionally, the projections 46 are disposed in the relatively rigid shoe member 24 rather than the tube element 16 to thereby avoid crushing or tearing of the projections. While four projections 46 have been illustrated, it should be appreciated that the number could vary while still coming within the scope of the present invention. The critical factors to be avoided are making the projections 46 too close together in which case the rubber between the adjacent indentation 52 is too thin and will rip or making the projections too short in which case the shoe may slide tangentially relative to the tube element 16. Additionally, if the projections 46 are too long, the tube 16 will have to be too thick and the shape factor as discussed hereinbelow will become undesirable.

Figure 5:
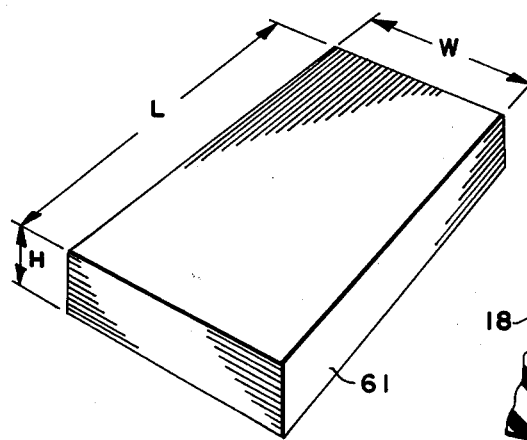
FIG. 5 is a schematic representation for determining the shape factor of a rubber element.

The shape factor of a block of rubber is the ratio of bonded area to the force-free area of a block of rubber. It is adopted as a measure of the restrictive effects of a bonded surface and of the relative use of the bulk modulus of the rubber which is considerably greater than the force-free modulus. The stiffness of a block of rubber can be roughly correlated in this way although the exact dependence of the shape factor has been shown to differ for different cross-sections so that the usefulness of this parameter is limited to comparing similar shapes with varying thicknesses. In order to determine the optimum thickness for the rubber or elastomeric element 16 of the present invention, one must consider the shape factor. To more fully understand shape factor, refer to FIG. 5 which schematically represents a block of rubber 16 having a width W, height H and length L. If the area W×L in FIG. 5 is the bonded area and the side areas, 2(HW+HL), are the free areas, then the shape factor S equals the bonded area over the force-free area or equals WL divided by 2H(W+L).

In order to maximize the torque carrying characteristics of the present coupling, it is desired to maximize the shape factor. To maximize the shape factor requires the height, H, to be minimized for any given width of tube element. In the present invention, the height is the distance between plies 60 and the exterior surface of the tube adjacent surface 44 of the shoe 24. The piles 60 add rigidity to the rubber element 16 and can be considered to define the bonded or rigid area for the calculation of the shape factor for the tube element 16. Since the area of the plies 60 immediately above the shoe members 24 can be considered essentially constant for an element 16 of a particular width, minimizing the distance between the plies and the surface 44 on the shoe member 24 maximizes the shape factor. Bonding of the shoe 24 to the exterior of the rubber tube with less than 0.050 inch of rubber between the plies 60 and the shoe 24 would produce the highest shape factor. However, bonding is not desirable from a practical standpoint since you cannot change the shoe. Thus, additional locking devices are required to permit changing the friction material when it becomes worn out and bonding is undesirable. In the present case it has been found desirable to maintain the rubber between the plies 60 and the shoe 24 between 0.050 and 0.120 inch.

Preferably, the shape factor is between 15 and 19 for tube elements used in the present couplings. The Applicants have found that a shape factor of 18 is optimum for their particular tube element which has a width of approximately seven inches. The shape factor of the tube 16 at the bottom of indentations 52 has been found to be 3.125 per square inch of rubber to shoe interface. The minimization of the distance between the exterior surface of the tube element 16 where the shoe surface 44 engages and the plies 60 reduces the moment arm by which the force is transferred from the shoe 24 to the plies 60 of the tube element 16. The shoe 24 transfers force therefrom in a tangential direction to the tube element 16. The plies 60 carry the main forces transferred to the tube element 16. Thus, the shoes 24 apply a force, essentially tangential, at the surface of the tube element 16. This force is transferred, through a moment arm equal to the distance between the plies 60 and the exterior surface of the tube element 16, to the plies 60.

The reduction of the moment arm through which force is transferred to the plies 60 increases the torque carrying capabilities of the coupling 10. Maximizing the shape factor reduces the moment arm and, hence, increases the torque carrying capabilities of the coupling 10. High shape factors, which result in less rubber volume in the tube 16, are important to minimize heat buildup. This is particularly desirable in clutch and brake elements which are often subjected to constant torsional vibrations.

The maximization of the width of the projections 46 parallel to the axis of rotation allows the height of the projections to be reduced while still maintaining adequate contact between the projections 46 and the indentations 52 to effect torque transfer. Reducing the height of the projections 56 while maximizing their width will maximize the shape factor of the rubber which forms the projections and increase the torque carrying capabilities of the tube element 16.

Each of the shoe members 24 includes a plurality of channels 64 disposed therein. The channels 64 are disposed substantially parallel to the axis of rotation and provide for the flow of air through the shoe member 24. This provides for cooling of the shoe member 24 which may get very hot during coupling of the drum 12 and rim assembly 14. The total cross-sectional area of the plurality of passageways 64 when taken perpendicular to the axis of rotation is greater than 50% of the cross-sectional area of the shoe member 24 taken perpendicular to the axis of rotation. By maintaining at least 50% of the cross-sectional area of the shoe member 24 in cooling passageways optimum cooling will result.

The tube element 16 is constructed such that the rubber in the stress area around the indentations or slots 52 flows in the direction of load during the molding of the tube element 16. When the tube 16 is constructed, a flat slab of rubber is provided where the slots 52 are to be disposed. The rubber is then placed in a mold member and subjected to heat and pressure which causes the rubber to flow out of the areas where the slots 52 are formed in a relatively tangential direction to the ultimate axis of rotation of the tube element 16. Since the rubber is stronger in the direction of its flow, this creates an ideal situation for the rubber around the slots 52 in the element 16.

It should be apparent that the construction of the shoe member 24 and the interface therewith with the tube element 16 has been designed to provide for maximum torque transfer therebetween while minimizing the cost and maximizing the efficiency of the total structure. The shape factor of the rubber tube was maximized to maximize the strength of the tube and, hence, the torque carrying characteristics thereof. The flow of cooling air has been maximized by providing cooling passageways having a cross-sectional area of at least 50% of the cross-sectional area of the shoe member 24. The projections 46 and the matching indentations 52 have an arcuate cross-sectional configuration to minimize stress risers or stress concentrations in the rubber of the tube element 16 to thereby minimize fatiguing of the element 16. Additionally, the width of the projections 46 and complementary indentations 52 is maximized to maximize the torque carrying capability of the coupling.

From the foregoing it should be apparent that a new and improved coupling has been provided, including a rim assembly, a drum assembly, and a pneumatically expandable tube element connected to the rim assembly for rotation therewith relative to the drum assembly. A plurality of spaced apart lugs are disposed on the tube element and a plurality of shoe members are provided which include first and second spaced apart parallel surfaces. Each of the shoe members include tabs thereon which are connectable with one of the lugs on the tube element to support the first surface of the shoe member contiguous to the exterior surface of the tube element. A plurality of projections are disposed on the first surface of each of the shoe members. Each of the projections is substantially parallel to the axis of rotation and has a length which is at least 80% of the width of the shoe member taken parallel to the axis of rotation. A plurality of parallel corresponding indentations are disposed on the exterior surface of the tube element and are each adapted to receive the corresponding one of the projections disposed on the shoe members. Each of the corresponding projections and indentations cooperate to transfer torque from the shoe member through the tube element to the rim assembly. The cross-sectional configuration of the projections and the cooperating indentations has a generally arcuate configuration to minimize stress risers or concentrations in the tube element 16 and thereby minimize fatiguing of the rubber. In order to maximize the torque carrying capability of the coupling, the shape factor of the tube element is maintained between 15 and 19.

We claim:

1. A coupling comprising an input member, an output member rotatable relative to said input member about an axis of rotation, a rim assembly connected to one of said input and output members, a drum assembly connected to the other of said input and output members, a fluid expandable tube element having an exterior surface connected to said rim assembly for rotation therewith relative to said drum assembly, a plurality of spaced apart lugs disposed on said exterior surface of said tube element, a plurality of shoe members each of which includes a first surface and a second surface disposed substantially parallel to said first surface, each of said shoe members including means disposed on said first surface connectable with one of said lugs on said tube element to support said first surface of said shoe members contiguous to the exterior surface of said tube element, a plurality of friction pads, one of which is secured to said second surface of each of said shoe members, said shoe members being movable in a radial direction between a first position in which said plurality of friction pads are engaged with said drum assembly to couple said input and output members upon expansion of said tube elements and a second position in which said plurality of friction pads are spaced apart from said drum assembly to permit relative rotation between said input and output members upon contraction of said tube element, a plurality of projections disposed on said first surface of each of said shoe members, each of said projections being substantially parallel to said axis of rotation and having a length which is at least 80% of the width of said shoe member taken parallel to said axis of rotation, and a plurality of parallel corresponding indentations disposed on said exterior surface of said tube element each of which has a length at least as long as the length of the corresponding projection, each of said indentations being adapted to receive the corresponding one of said projections disposed on said shoe members therein, each of said projections on said shoe members cooperating with its corresponding indentation disposed on said tube element to transfer torque from said shoe member, through said tube element to said rim assembly.

2. A coupling as defined in claim 1 wherein each of said shoe members includes a plurality of cooling passages disposed therein, each of said cooling passages being disposed substantially parallel to said axis of rotation and wherein the total cross-sectional area of said plurality of cooling passages taken substantially perpendicular to the axis of rotation is equal to at least 50% of the cross-sectional area of each of said shoe members taken approximately perpendicular to said axis of rotation.

3. A coupling as defined in claim 1 wherein each of said projections includes a crown portion and a pair of root portions, said crown portion being interposed between said root portions and each of said root portions being disposed between said crown portions and said first surface of said shoe member, each of said crown and root portions having a substantially arcuate cross-sectional configuration taken substantially perpendicular to said axis of rotation to thereby minimize stress concentrations in the corresponding indentations in the tube element upon torque transfer between the corresponding projections and indentations.

4. A coupling as defined in claim 1 wherein said means disposed on said first surface of said shoe members includes at least a pair of spaced apart tabs each of which includes an opening therein, each of said lugs includes an opening disposed therein, each of said pair of tabs being spaced apart a distance which is greater than the width of said lugs taken parallel to said axis of rotation and further including a pin member adaptable to be received in said opening in each of said tabs and in said opening in a lug interposed between said tabs to thereby secure said shoe member to said lug for movement therewith.

5. A coupling as defined in claim 4 wherein each of said tabs extends in a radial direction from said first surface of said shoe member, each of said tabs being in part defined by a tab surface which is spaced outwardly in a radial direction from said first surface of said shoe member, said tab surface being spaced apart from said exterior surface of said tube member to prevent abrasion between said tab surface and said tube element.

6. A coupling as defined in claim 4 wherein the outer diameter of said pin member is less than the inner diameter of said opening in said lug in which said pin member is received.

7. A coupling as defined in claim 5 wherein the outer diameter of said pin member is less than the inner diameter of said opening in said lug in which said pin member is received.

8. A coupling as defined in claim 1 wherein the shape factor of said tube element is at least as large as 15.

9. A coupling as defined in claim 1 wherein each of said projections has a length which is equal to the width of said shoe member and each of said plurality of parallel corresponding indentations has a length at least as long as the length of said corresponding projection.

10. A coupling as defined in claim 1 wherein said means disposed on said first surface of said shoe members includes two pair of spaced apart tabs, each of said pair of spaced apart tabs including an opening therein said openings in each of said pair of tabs being aligned, said pairs of spaced apart tabs being disposed at opposite ends of said shoe member and being spaced apart about the circumference of said tube element, each of said lugs includes an opening disposed therein, and further including a plurality of pin members each of which is adaptable to be received in the aligned openings in each of said pairs of tabs and in said opening in a lug interposed between said pair of tabs to thereby secure said shoe member to said lug for movement therewith.

11. A coupling as defined in claim 10 wherein the distance between the exterior surface of each of said lugs and the interior surface of said opening in said lugs is greater than the distance between said first surface of said shoe member adjacent said tube and the exterior surface of said pin member disposed in said openings in said pair of tabs to preload the shoe member into the exterior surface of said tube element when said tube element is in its contracted condition.

12. A coupling as defined in claim 10 wherein said openings disposed in said lugs have a substantially circular cross-section when the tube element is in its contracted condition and have a substantially oblong cross-section when said tube element is in its expanded condition and said lugs are in a state of compression caused by the engagement of said friction pads and said rim assembly, said openings when having said oblong cross-section relieving the strain exerted on said lugs due to the torque transferred from said rim assembly through said tube element, through said shoe members, through said friction pads to said drum assembly.

13. A coupling comprising a rim assembly, a drum assembly rotatable relative to said rim assembly about an axis of rotation, a fluid expandable tube element having an exterior surface connected to said rim assembly for rotation therewith relative to said drum assembly, a plurality of spaced apart lugs disposed on said exterior surface of said tube element, a plurality of shoe members each of which includes a first surface and a second surface disposed substantially parallel to said first surface, each of said shoe members including means disposed on said first surface connectable with one of said lugs on said tube element to support said first surface of said shoe member contiguous to the exterior surface of said tube member, a plurality of friction pads, one of which is secured to said second surface of each of said shoe members, said shoe members being movable in a radial direction between a first position in which said plurality of friction pads are engaged with said drum assembly to couple said drum assembly and rim assembly upon expansion of said tube element and a second position in which said plurality of friction pads are spaced apart from said drum assembly to permit relative rotation between said drum assembly and said rim assembly upon contraction of said tube element, a plurality of projections disposed on said first surface of each of said shoe members, each of said projections being disposed substantially parallel to said axis of rotation and having a substantially arcuate cross-sectional configuration taken substantially perpendicular to said axis of rotation, and a plurality of parallel corresponding indentations disposed on said exterior surface of said tube member having a length at least as long as the corresponding projection, each of said indentations having a substantially arcuate cross-sectional configuration taken substantially perpendicular to said axis of rotation and being adapted to receive said corresponding projection on said shoe member therein, each of said indentations being disposed contiguous to the corresponding projection received therein, each of said projections cooperating with its corresponding indentation to transfer torque from said shoe member, through said tube element, to said rim assembly.

14. A coupling as defined in claim 13 wherein each of said shoe members includes a plurality of cooling passages disposed therein, each of said cooling passages being disposed substantially parallel to said axis of rotation and wherein the total cross-sectional area of said plurality of cooling passages taken substantially perpendicular to the axis of rotation is equal to at least 50% of the cross-sectional area of each of said shoe members taken approximately perpendicular to said axis of rotation.

15. A coupling as defined in claim 13 wherein each of said projections having an arcuate cross-sectional configuration includes a crown portion and a pair of root portions, said crown portion being interposed between said root portions and each of said root portions being disposed between said crown portion and said first surface of shoe member, each of said crown and root portions having a substantially arcuate cross-sectional configuration taken substantially perpendicular to said axis of rotation to thereby minimize stress concentrations in the corresponding indentations in the tube element upon torque transfer between the corresponding projections and indentations.

16. A coupling as defined in claim 13 wherein said means disposed on said first surface of said shoe members includes at least a pair of spaced apart tabs each of which includes an opening therein, each of said lugs includes an opening disposed therein, each of said pairs of tabs being spaced apart a distance which is greater than the width of said lugs taken parallel to said axis of rotation and further including a pin member adaptable to be received in said opening in each of said tabs and in said opening in a lug interposed between said tabs to thereby secure said shoe member to said lug for movement therewith.

17. A coupling as defined in claim 16 wherein each of said tabs extends in a radial direction from said first surface of said shoe member, each of said tabs being in part defined by a tab surface which is spaced outwardly in a radial direction from said first surface of said shoe member, said tab surface being spaced apart from said exterior surface of said tube member.

18. A coupling as defined in claim 17 wherein the shape factor of said tube element is at least as large as 15.

19. A coupling as defined in claim 13 wherein each of said projections has a length which is equal to the width of said shoe member and each of said plurality of parallel corresponding indentations has a length at least as long as the length of said corresponding projection.

20. A coupling as defined in claim 13 wherein said means disposed on said first surface of said shoe members includes two pair of spaced apart tabs, each of said pair of spaced apart tabs including an opening therein said openings in each of said pair of tabs being aligned, said pairs of spaced apart tabs being disposed at opposite ends of said shoe member and being spaced apart about the circumference of said tube element, each of said lugs includes an opening disposed therein, and further including a plurality of pin members each of which is adaptable to be received in the aligned openings in each of said pairs of tabs and in said opening in a lug interposed between said pair of tabs to thereby secure said shoe member to said lug for movement therewith.

21. A coupling as defined in claim 20 wherein the distance between the exterior surface of each of said lugs and the interior surface of said opening in said lugs is greater than the distance between said first surface of said shoe member adjacent said tube and the exterior surface of said pin member disposed in said openings in said pair of tabs to preload the shoe member into the exterior surface of said tube element when said tube element is in its contracted condition.

22. A coupling as defined in claim 13 wherein said openings disposed in said lugs have a substantially circular corss-section when the tube element is in its contracted condition and have a substantially oblong cross-section when said tube element is in its expanded condition and said lugs are in a state of compression caused by the engagement of said friction pads and said rim assembly, said openings when having said oblong cross-section relieving the strain exerted on said lugs due to the torque transferred from said rim assembly through said tube element, through said shoe members, through said friction pads to said drum assembly.

23. A coupling comprising a rim assembly, a drum assembly rotatable relative to said rim assembly about an axis of rotation, a fluid expandable tube element having an exterior surface connected to said rim assembly for rotation therewith relative to said drum assembly, said tube element including a plurality of plies and a plurality of spaced apart lugs disposed on said exterior surface, a plurality of shoe members, each of which includes a first surface and a second surface disposed substantially parallel to said first surface, each of said shoe members including means disposed on said first surface connectable with one of said lugs on said tube element to support said first surface of said shoe member contiguous to said exterior surface of said tube member, said tube having a shape factor at least as large as 3.125 per square inch of interface between said first surface of said shoe member and said exterior surface of said tube member, a plurality of friction pads, one of which is secured to said second surface of each of said shoe members, said shoe members being movable in a radial direction between a first position in which said plurality of friction pads are engaged with said drum assembly to couple said input and output members upon expansion of said tube element and a second position in which said plurality of friction pads are spaced apart from said drum assembly to permit relative rotation between said input and output members upon contraction of said tube element, a plurality of projections disposed on said first surface of each of said shoe members substantially parallel to said axis of rotation, a plurality of parallel corresponding indentations disposed on said exterior surface of said tube member having a length at least as long as the length of each of said corresponding projections, each of said indentations being adapted to receive said corresponding projection therein to provide for the transfer of torque from said shoe member, through said tube element to said rim assembly.

24. A coupling as defined in claim 15 wherein each of said projections includes a crown portion and a pair of root portions, said crown portion being interposed between said root portions and each of said root portions being disposed between said crown portion and said first surface of said shoe member, each of said crown and root portions having a substantially arcuate cross-sectional configuration taken substantially perpendicular to said axis of rotation to thereby minimize stress concentrations in the corresponding indentations in the tube element upon torque transfer between the corresponding projections and indentations.

* * * * *